Oct. 27, 1936.   G. A. BARBER   2,058,758
MEANS FOR HANDLING STRANDS
Filed June 22, 1934   3 Sheets-Sheet 1
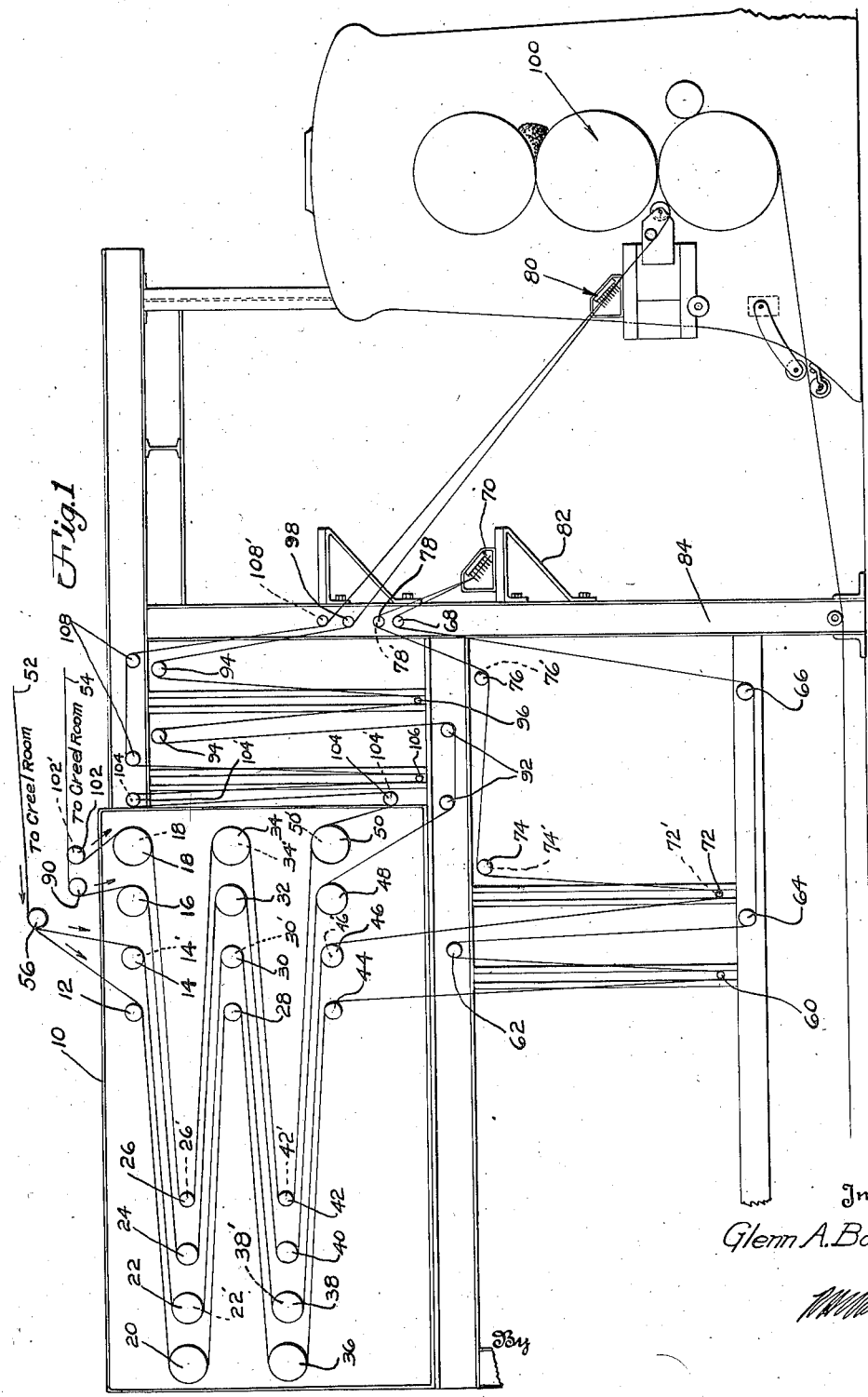
Inventor
Glenn A. Barber
Attorney

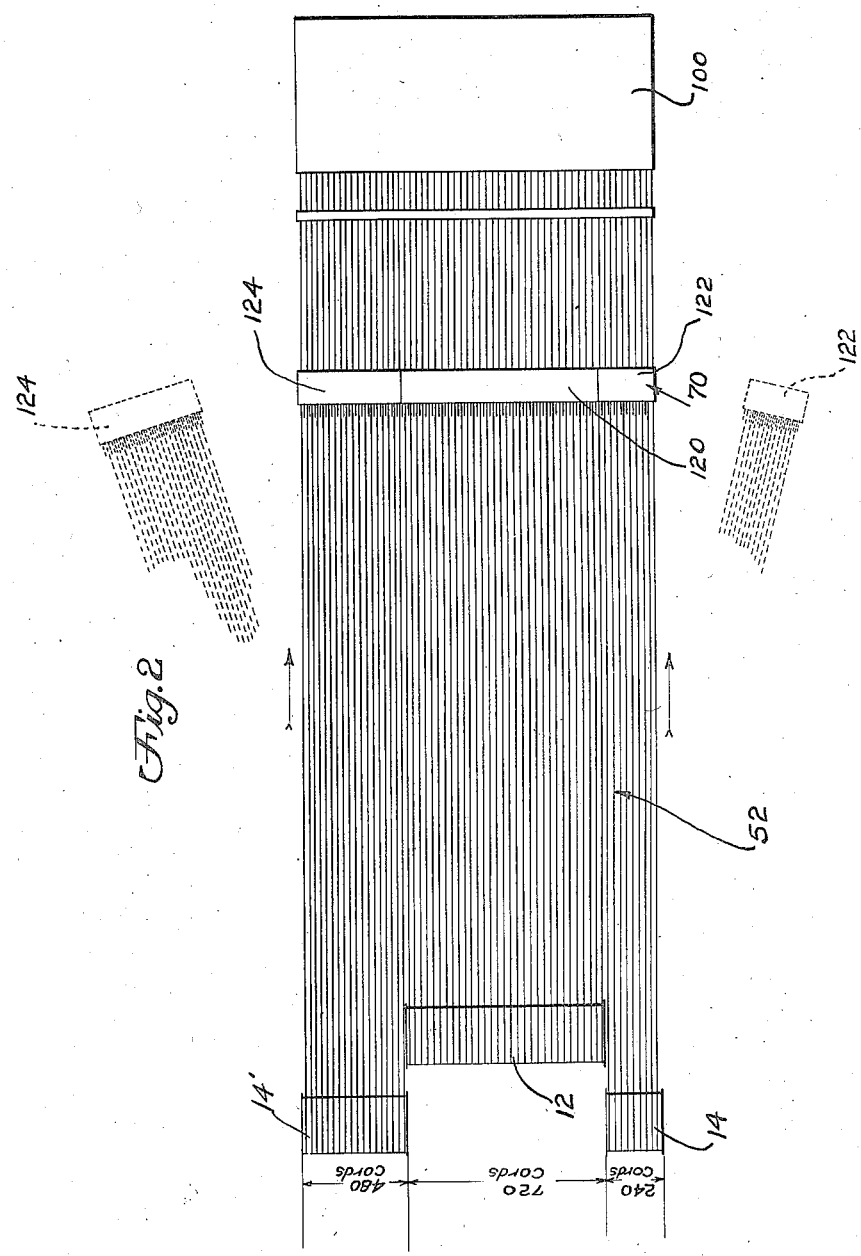

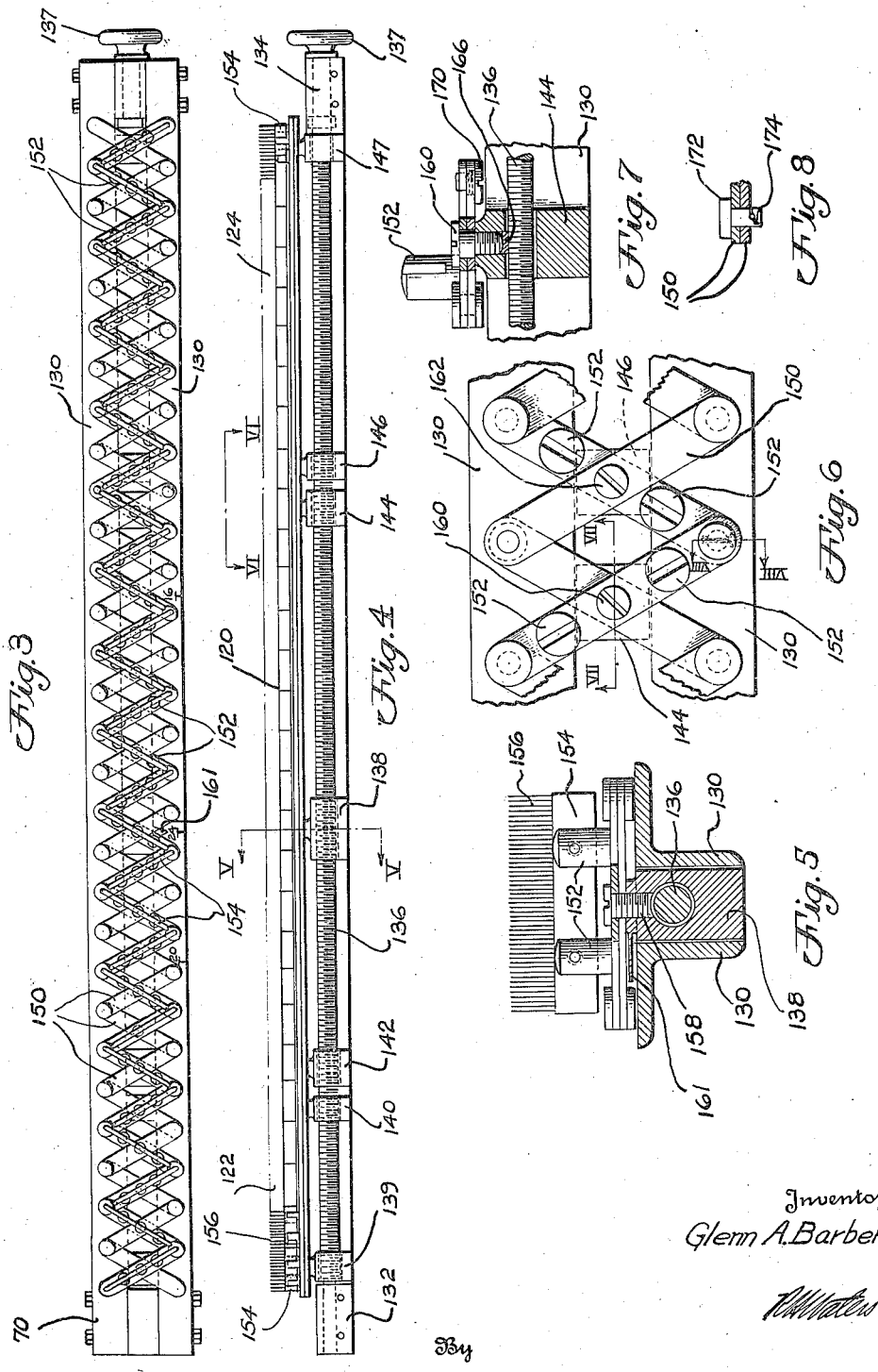

Patented Oct. 27, 1936

2,058,758

UNITED STATES PATENT OFFICE 2,058,758

MEANS FOR HANDLING STRANDS

Glenn A. Barber, Kent, Ohio, assignor to Wingfoot Corporation, Wilmington, Del., a corporation of Delaware Application June 22, 1934, Serial No. 731,842

2 Claims. (Cl. 28—22)

This invention relates to mechanism for handling and guiding cords and is more particularly adapted for use in the production of weftless rubberized fabric for use in building pneumatic tires or the like.

It has heretofore been proposed to pass a plurality of cords through suitable guiding means into aligned parallel relation so that a weftless sheet of fabric is created and to pass the weftless cord fabric to a rubberizing calender which applies rubber in the nature of a skim-coating or cord-frictioning layer on one or both sides of the fabric. The rubber itself functions to hold the cords in the proper aligned relation and replaces the necessity of employing weft or pick cords such as ordinarily used in standard fabric. Weftless cord fabric of this type has been found very satisfactory for the manufacture of pneumatic tire carcasses in that the probable additional expense of pick or weft cords is largely eliminated and with possibly the additional advantage of having a finished tire carcass in which there are no cross or weft threads which might on occasion operate to cut through the main warp or longitudinal cords in the continuous flexing to which the tire is subjected in use.

Various types of cord-guiding and aligning means are disclosed by the prior art, substantially all of which employ some type of roller or slide bar over which the cords are passed either before or after having passed through a guiding comb which is adapted to properly space the cords laterally. However in this known type of equipment while provision is made to adjust the distance between the dents or teeth of the comb it is impossible to change the distance between the individual cords without altering the overall width of the sheet.

Inasmuch as the rubberizing calenders and, for that matter, substantially all of the fabric-handling and coating equipment in the tire industry is adapted to handle a standard 60-inch width of fabric, smaller or greater widths are handled only with difficulty and are very apt to throw out of alignment the fabric and handling mechanism. Also the change in width of the fabric has been found to adversely affect the sizes of the fabric cut on the bias from the main sheet and to thereby complicate the manufacture of the plied-up tire carcass.

It is also desirable to run fabric of different cord spacing while maintaining the width of the sheet constant in order to meet the requirements of various sizes of tires. For example in certain fabrics it is advantageous to have approximately 20 cord ends per inch while in other fabric, 16 and 24 cord ends per inch are advisable. In prior-known types of cord-guiding and handling mechanism it has been impossible to readily change from one style of fabric to another and maintain the width of the fabric constant or substantially so.

It is an object of the present invention to avoid and overcome the foregoing difficulties of prior-known cord-guiding and handling devices by the provision of a simple, practical and efficient mechanism which can be readily adapted to produce fabric of any desired characteristics and in which the number of cord ends per inch can be altered without changing the overall width of the fabric.

Another object of the invention is to provide cord-guiding mechanism adapted to handle weftless cords to produce sheets of rubberized weftless fabric having any desired number of warp cords in a standard width of sheet.

Another object of the invention is to provide a cord-drying and equalizing chamber with suitable cord-handling and supporting means which individually carry certain groups of cords strategically arranged so that certain standard types of fabric cain be run in a constant width if desired. These individual cord-guiding and carrying means are journaled independently of each other in such fashion that various selected groups of the cords can be run through the drier and equalizer and otherwise treated independently of the other.

Another object of the invention is to provide a multi-part cord-guiding comb which is made up of a plurality of individual sections which can be assembled together or readily taken apart to give a support and guide for a plurality of individual groups of cords which may be run separately or simultaneously to provide weftless fabric webs or sheets possessing the desired number of cord ends per inch. The comb sections are adapted to be expanded or contracted when used individually or together so that webs of standard width can be produced.

Another object of the invention is to provide an improved method of handling weftless cords during or before the rubberizing of the cords upon a treating calender.

The foregoing and other objects of the invention are achieved by the method hereafter described and the apparatus illustrated in the accompanying drawings, wherein:

Fig. 1 is a side elevation of one embodiment of the apparatus;

Fig. 2 is a plan view which diagrammatically illustrates the apparatus of the invention;

Fig. 3 is a plan view of the sectional comb forming a part of the invention;

Fig. 4 is a side elevation of the comb shown in Fig. 3;

Fig. 5 is a cross-sectional view taken on line 5—5 of Fig. 4;

Fig. 6 is an enlarged fragmentary view of a portion of the comb shown in Figs. 3 and 4 and is taken as indicated by the line 6—6.

Fig. 7 is a cross-sectional view taken on line 7—7 of Fig. 6.

Fig. 8 is a cross-sectional view taken on line 8—8 of Fig. 6.

It will be appreciated that the principles of the invention are broadly applicable to the textile, weaving and associated industries and arts, but that the cord-handling improvement is particularly adapted for use with apparatus for the manufacture of weftless cord fabric employed in the pneumatic-tire industry. Accordingly the invention has been illustrated in one best-known embodiment in association with calendering means for producing the rubberized fabric having only warp cords in the rubber sheet which are held together by the rubber binder.

In Fig. 1 of the drawings the numeral 10 indicates generally a drying and cord-equalizing chamber in or through which suitable means may create or pass heated fluid or other treating media. In the chamber are journaled a plurality of rollers 12, 14, 16, 18, 20, 22, 24, 26, 28, 30, 32, 34, 36, 38, 40, 42, 44, 46, 48 and 50 which function to guide and support two sets of cords indicated generally at 52 and 54. The set of cords 52 is of a size designed for passenger-car tires, while the set of cords 54 is somewhat heavier in cross-sectional contour and tensile strength and is adapted to be employed in truck-tire fabric.

Considering first the set of cords 52, the individual cords pass from the creel room in the direction indicated by the arrows over a stationary guide bar 56 to the rolls 12 and 14. The center portion only of the cords in the set 52 are passed over the roller 12 as indicated diagrammatically in Figure 2, while the roller 14 and a second roller 14' positioned behind the roller 14 function to carry the cords forming the edge areas of the cord set 52. The central portion of the cords carried over the roll 12 pass in succession to and over the rolls 20, 28, 36 and 44 which are of any required number to properly effect the desired drying and equalizing action. The rolls are preferably of graduated diameters and are positioned as shown to produce the best results with the least space.

The central portion of the cords then passes to a vertically movable take-up roller 60, rolls 62, 64, 66 and 68 and to a comb indicated generally by the numeral 70. One group of the edge portions of the cord set 52 pass over the rolls 14, 22, 30, 38 and 46. The cord group at the other side of the cord set is carried by rollers 14', 22' 30', 38' and 46' which are ordinarily positioned in axially spaced alignment with the other edge-carrying rolls. From the rollers in the drying and equalizing chambers the edge portions of the cord pass to tension bars 72 and 72', idle rolls 74 and 74', 76 and 76' and 78 and 78' and thence to comb 70.

As indicated in Fig. 1 the comb 70 is adapted to be used alternatively with a comb 80 carrying the cord set 54 to be hereafter described. The comb 70 is shown not in use and is accordingly mounted upon a suitable shelf 82 secured to a framework 84 which may be adapted to carry the various cord-guiding rolls as well as the drying and equalizing chamber 10.

Referring now to the handling of the cord set 54 as seen in Fig. 1, the cords run from the creel room in the direction shown by the arrows. The center portion of the cord set is passed over rollers 90, 16, 24, 32, 40, 48 and over idler rolls 92, 94, tension bar 96 and rolls 98 to and through the comb 80 and thence to the rubberizing calender shown generally at 100. As stated above with respect to the cord set 52 the position, number and relation of the various rolls can be varied as necessary or desirable in the particular installation without departing from the teachings of the invention.

The two cord groups at the edge portions of the cord set 54 are passed over spaced, individually journaled rolls 102 and 102' similar to rolls 14 and 14' seen in Fig. 2 of the drawings. From the rolls 102 and 102' the edge cords of the sheet pass over rolls 18 and 18', 26 and 26', 34 and 34', 42 and 42', 50 and 50', idler rolls 104 and 104', tension bars 106 and 106', idler rolls 108 and 108' and thence to and through the comb 80 and to the rubberizing calender 100 as hereafter described. It will be noted that the set of cords 52 has been described as passing over a stationary bar 56 while the set 54 of cords has been shown and described as passing over independent rollers 90, 102 and 102'. The later arrangement is preferred as wear and twisting on the cords is eliminated. A single bar such as 56 over which the cords may slide is ordinarily not objectionable where the contacting arc is small but their use should be avoided.

From the foregoing description it will be evident that the drying and equalizing chamber is adapted to receive and handle either passenger-tire-size cords or truck-tire-size cords and that each one of these different sets of cords is carried on a plurality of individually journaled rollers so that the width of the cord sheath is made up of a plurality of distinct groups of cords. As seen in diagrammatic Fig. 2 the central portion of the cord set 52 is carried by the roller 12. In the particular installation indicated in the drawings 720 cords are carried by this roll. The edge portions of the cord set 52 are carried by the rolls 14 and 14', which portions comprise 240 and 480 cords respectively.

Associated with the cord sets 52 and 54 are the combs 70 and 80 respectively and, as shown diagrammatically in Fig. 2, each one of the combs is formed of a plurality of removably connected sections which are adapted to handle individually the same group of cords as are individually carried by the associated rollers 12, 14 and 14' etc. In Fig. 2 the comb 70 has been diagrammatically indicated as including a central section 120 and side sections 122 and 124. With the cords travelling in the direction shown by the arrow the cords pass from the individually journaled rollers to the individual comb sections and thence to the rubber calender shown generally at 100. As seen in dotted lines in Fig. 2 the end-comb sections 122 and 124 are adapted to be individually or collectively removed from the middle section 120 of the comb 70 and to carry their cords with them, the individual cords being clamped to the comb by suitable clamping bars not shown. Thus if it is desired to run a sheet of fabric having 24 cords per inch or 1440 cords in its full 60-inch width, then the full width of comb 70, that is all sections of comb 70, will be employed. On the other hand when it is desired to run fabric having only 20 cords per inch comb section 122 will be removed from the comb 70 and the comb sections 120 and 124 will be expanded to the full 60-inch width to run a fabric sheet having 1200 cords. As a still further alternative, comb section 124 can be removed with its corresponding cords so that only 960 cords will be run in the full 60-inch width, after the remaining comb sections 120 and 122 are expanded. In this embodiment of the invention 16 cords per inch are produced in the fabric. Many other variations are possible in cords per inch or fabric width.

It will be appreciated that the exact figures and fabric sizes, as well as the number of comb sections forming the complete comb have been given specifically to illustrate one embodiment of the present invention and that these figures, sizes and relation of parts can be appropriately varied to meet given requirements or specifications without departing from the teachings of the invention or the scope of the appended claims.

The details of a suitable comb structure (comb 70 having been selected for illustration) are shown in Figures 3 to 8 as comprising a frame formed of angle irons 130 which are secured together at their ends by suitable brackets 132 and 134. The brackets 132 and 134 serve to receive and journal the ends of a threaded shaft 136 having an operating wheel 137. The shaft 136 carries a threaded nut 138 and which likewise supports suitably apertured blocks 139, 140, 142, 144, 146 and 147, which do not have threaded engagement with the shaft. Mounted upon the nut 138 and the blocks 139, 140, 142, 144, 146 and 147 is a lazy-tong structure which is formed of a plurality of metallic strips 150 secured pivotally together at their ends and middles as shown in the drawings and is well known in the art. Every other metal strip 150 in the lazy-tong structure is provided with posts 152 which receive combs 154 formed with a plurality of individual dent pins 156 which function to receive and guide the cords.

As shown in Fig. 5 of the drawings the nut 138 threaded on the shaft 136 is secured to the lazy-tong structure by a cap screw 158 and the nut is provided with a pointer 161 which cooperates with marks 16, 24 and 20 formed on the angle frame of the comb 70. It will be evident from the drawings the central portion 120 of the comb is mounted on the blocks 142, 144 and the nut 138. The end section 122 of the comb is mounted on the blocks 139 and 140 while the comb section 124 is mounted on blocks 146 and 147. As seen in the drawings cap screws 160 and 162 are used for this purpose.

The cap screws also serve to secure the blocks in place upon the threaded shaft 136 so that there can be no relative movement of the blocks and shaft once the blocks are fastened in position. A brass plug or washer 166 may be positioned between the end of the screw 160 and threaded shaft 136 to prevent damaging the threads on the shaft. Fig. 7 is typical of the manner in which the ends of the comb sections are secured together and mounted on the supporting blocks.

The individual links or strips of the ends of the lazy-tong comb sections, and thus comb sections 120, 122 and 124 are releasably fastened together as illustrated in Figures 7 and 8. At one side of the lazy tong the links are held as in Fig. 7 which shows a short cap screw 170 threaded into the lowermost link and extending upwardly into a suitable aperture in the associated link. Fig. 8 shows how the other side of the linkage may be fastened as by a headed pin 172 which is removably secured, as by a cotter key 174, in aligned apertures on the ends of the companion pair of links.

It is believed that the construction and operation of the cord-handling mechanism will be evident from the foregoing description, however it briefly is as follows: When it is desired to run the 60-inch, full-width fabric with 1440 cords in the fabric width a complete comb is used with the marker 161 being set over the number 24, which is the number of cords per inch in the finished fabric.

The ends of the central comb section 120 are secured to the blocks 142 and 144 as illustrated in the drawings and the end comb sections 122 and 124 are secured respectively to blocks 139 and 140 and blocks 146 and 147.

A full comb is accordingly used as illustrated in Figure 2 and the cords are passed over the rollers 12, 14 and 14' and the related rollers as heretofore described, it being understood that the set 52 of passenger-tire-size cords will be utilized. If the cord set 54 is used the associated rollers and comb 80 will be employed as heretofore described in detail.

When it is desired to run 1200 cords in the 60-inch width or 20 cord ends per inch the comb section 122 is removed by taking out the headed pin 172 securing the links of the lazy-tong structure of the central- and end-comb sections together, and the cap screws 160 will be removed to permit the entire comb section 122 to be lifted off of the supporting blocks 139 and 140. The removal of an end-comb section is illustrated diagrammatically in Fig. 2. The removed comb section 122 will be supported on a suitable shelf beside the central-comb section with all of the 240 cords carried by the end-comb section 122 being retained in clamped position on the section. The ends of the cords carried by this section are cut adjacent the comb and between the comb and the calender 100.

After the end-comb section 122 has been removed the now-loose block 140 is moved over against the loose-end block 139, the cap screws holding the remaining comb sections to the blocks 142, 144 or 146 are loosened and the operating handle 137 on threaded shaft 136 is turned to move the nut 138 carrying the pointer 161 along the frame until the pointer is over the 20 mark on the frame. The central-comb section 120 and the end-comb section 124 will now be expanded by hand substantially to the full 60-inch calender width and to the full length of the frame. This will be possible because the blocks 142, 144 and 146 can be slid over the shaft 136. The cap screws in the blocks 142, 144 and 146 are tightened down to secure the blocks in their new positions on the threaded shaft and to likewise fasten the comb sections securely to the blocks.

The two-section comb is used in the regular manner with its associated rollers, which in this case will only be the rollers 12 and 14' and the related roller groups with the cords being expanded out to the full fabric width as they reach the comb. The remaining or removed cords carried by the roller 14 and end-comb section 122 will merely remain stationary while the other cords will be passed through the drier and equalizer and aligning comb to the coating calender.

The conversion of the apparatus to produce fabric having 960 cords in the 60-inch width or 16 cords per inch is readily accomplished by removing the end-comb section 124 in the manner described above with respect to end-comb section 122, and then expanding the remaining comb sections to the full width of the frame after the hand wheel 137 is adjusted to bring the nut 138 and pointer 161 above the mark 16 on the frame. In a manner similar to that heretofore recited the removed end section 124 of the comb will be laid upon a suitable support associated with the central section of the comb and the cords between the calender and the comb will be cut clamping the cord ends on the section 124 of the comb. Thus when only sections 120 and 122 of the comb are used the cords pass over rollers 12 and 14 and associated rollers. Roller 14' and other related rollers will not be employed.

Due to the thickness of the blocks 139 and 140 and 146 and 147 the fabrics having a reduced number of cord ends per inch may not be quite so wide as the fabric run with all the comb sections, however if this is found undesirable the length of the frame 130, 132 and 134 of the comb may be lengthened in order to take care of the slight variation in width occasioned by converting the number of threads per inch handled by the comb.

From the foregoing description it will be evident that by the present invention an improved method and means for handling and guiding cords and particularly weftless rubber fabric cords has been provided with the method and means being readily adapted to be installed in commercial production line-ups with the change from one type of fabric to another being greatly facilitated. Any number of cord ends per inch can be run with the same width fabric being maintained. There is no lengthy and expensive operation of threading different-sized combs or in alternating in the use of combs of different characteristics. The improved mechanism of the present invention functions to handle the cords not only in the drying and equalizing chamber, which also functions to preheat the cords if desired, but also serves to align and carry the cords by a novel comb device from which they are passed to the calender.

While in accordance with the patent statutes one well-known embodiment of the invention has been illustrated and described in detail, it will be appreciated that the invention is not limited thereto or thereby but is defined in the appended claims.

What I claim is:

1. In mechanism adapted to feed weftless cords to a rubberizing calender the combination of a cord dryer and equalizer including a plurality of rollers over which the cords pass while arranged in sheet form, certain of said rollers being independently journaled and of such length to carry the central portion only of the sheet formed by the cords, other of said rollers being independently journaled and of such length to carry the edge portions only of the sheet formed by the cords, and a multi-part comb associated with the dryer and equalizer for guiding the cords in sheet-forming alignment, said comb including a center section for guiding the central portion of the sheet formed by the cords and end comb sections removably secured to the center section for guiding the edges of the sheet formed by the cords.

2. In mechanism adapted to feed weftless cords to a rubberizing calender the combination of a cord dryer and equalizer including a plurality of rollers over which the cords pass while arranged in sheet form and a multi-part comb associated with the dryer and equalizer for guiding the cords in sheet-forming alignment, said comb including a center section for guiding the central portion of the sheet formed by the cords and end comb sections removably secured to the center section for guiding the edges of the sheet formed by the cords.

GLENN A. BARBER.